「12) United States Patent
Hu et al.

(10) Patent No.: US 11,616,272 B2
(45) Date of Patent: *Mar. 28, 2023

(54) BATTERY SEPARATOR SUBSTRATE INCLUDING DENSE LAYER FORMED ON SUPPORT LAYER, AND METHOD FOR PREPARING THE SAME

(71) Applicant: FIBRWAY MATERIAL SCIENCE & TECHNOLOGY DEVELOPMENT CO., LTD., Guangzhou (CN)

(72) Inventors: Jian Hu, Guangzhou (CN); Jin Long, Guangzhou (CN); Yunzhen Yao, Guangzhou (CN); Yi Wang, Guangzhou (CN); Yang Wang, Guangzhou (CN); Ling Meng, Guangzhou (CN)

(73) Assignee: FIBRWAY MATERIAL SCIENCE & TECHNOLOGY DEVELOPMENT CO., LTD., Guangzhou (CN)

( * ) Notice: Subject to any disclaimer, the term of this patent is extended or adjusted under 35 U.S.C. 154(b) by 291 days.

This patent is subject to a terminal disclaimer.

(21) Appl. No.: 16/909,036

(22) Filed: Jun. 23, 2020

(65) Prior Publication Data

US 2020/0321581 A1    Oct. 8, 2020

Related U.S. Application Data

(63) Continuation of application No. PCT/CN2017/118482, filed on Dec. 26, 2017.

(51) Int. Cl.
*H01M 50/44*       (2021.01)
*H01M 10/0525*    (2010.01)
(Continued)

(52) U.S. Cl.
CPC ....... *H01M 50/44* (2021.01); *H01M 10/0525* (2013.01); *H01M 50/403* (2021.01); *H01M 50/4295* (2021.01)

(58) Field of Classification Search
USPC ................. 429/144, 145, 251, 254
See application file for complete search history.

(56) References Cited

U.S. PATENT DOCUMENTS

2016/0049627 A1* 2/2016 Hu ................. H01M 50/4295
                                                              429/406
2020/0321583 A1* 10/2020 Hu ................. H01M 50/457

FOREIGN PATENT DOCUMENTS

CN        103137931 A       6/2013
CN        104037375 A       9/2014
(Continued)

OTHER PUBLICATIONS

First Office Action issued in counterpart Chinese Patent Application No. 201711442971.1, dated Aug. 4, 2020.
(Continued)

*Primary Examiner* — Sean P Cullen
(74) *Attorney, Agent, or Firm* — Westbridge IP LLC (57) ABSTRACT

A lithium ion battery separator substrate, a preparation method and application thereof are provided. The substrate comprises a support layer and a dense layer, wherein the support layer comprises superfine main fibers, thermoplastic bonded fibers and the nanofibers, and the dense layer comprises nanofibers. The substrate has excellent high-temperature resistance performance, the substrate still has certain strength after being processed at 300° C. for 1 h, and the heat shrinkage rate is less than 5.0%; the substrate has a uniform and compact double-layer structure without a pinhole. Therefore, the requirements concerning heat resistance, porosity and strength of the substrate are met.

6 Claims, 1 Drawing Sheet

(51) Int. Cl.
  *H01M 50/429* (2021.01)
  *H01M 50/403* (2021.01)

(56) References Cited

FOREIGN PATENT DOCUMENTS

| | | | | |
|---|---|---|---|---|
| CN | 104157812 A | * | 11/2014 | ........ H01M 10/0525 |
| CN | 104157812 A | | 11/2014 | |
| CN | 104309232 A | | 1/2015 | |
| CN | 104332577 A | | 2/2015 | |
| CN | 104870156 A | | 8/2015 | |
| CN | 106601966 A | | 4/2017 | |
| JP | 2005159283 A | | 6/2005 | |
| JP | 2010129308 A | | 6/2010 | |
| JP | 2012199034 A | | 10/2012 | |
| JP | 2015060702 A | | 3/2015 | |
| WO | 2011046066 A1 | | 4/2011 | |
| WO | 2012128471 A2 | | 9/2012 | |

OTHER PUBLICATIONS

International Search Report and Written Opinion issued in corresponding PCT Application No. PCT/CN2017/118482, dated Aug. 31, 2018.
Long et al., A Nano-Based Multilayer Separator for Lithium Rechargeable Battery, International Journal of Electrochemical Science, vol. 11, 2016, pp. 6552-6563, dated Jul. 7, 2016.
Notice of Reasons for Refusal issued in counterpart Japanese Patent Application No. 2020-533702, dated Jun. 14, 2021.
Request for the Submission of an Opinion issued in counterpart Korean Patent Application No. 10-2020-7016808, dated Sep. 17, 2021.
Second Office Action issued in counterpart Chinese Patent Application No. 201711442971.1, dated Apr. 6, 2021.
Third Office Action issued in counterpart Chinese Patent Application No. 201711442971.1, dated Oct. 18, 2021.

* cited by examiner

FIG. 1

FIG. 2

BATTERY SEPARATOR SUBSTRATE INCLUDING DENSE LAYER FORMED ON SUPPORT LAYER, AND METHOD FOR PREPARING THE SAME

CROSS-REFERENCE TO RELATED APPLICATIONS

This application is a continuation of International Application No. PCT/CN2017/118482, filed on Dec. 26, 2017, the disclosure of which is hereby incorporated by reference in its entirety.

TECHNICAL FIELD

The disclosure relates to the technical field of battery, in particular, to a lithium ion battery separator substrate and preparation method and application thereof.

BACKGROUND

Lithium ion batteries have many advantages, such as high operating voltage, high energy density and good environmental performance, so that lithium ion batteries become the best choice for clean power of electric vehicles. With the urgent need for the cruising range and quick charge and discharge performance of electric vehicles, power batteries are required to have larger capacity, higher safety performance and large rate charge-discharge performance. However, as the energy density, volume and weight of lithium ion batteries increase, their heat dissipation and stability deteriorate, so that the phenomenon of thermal runaway is more likely to occur. Safety issues have become the bottleneck restricting the development of lithium ion batteries in this field and need to be solved. The separator is a key technical material to prevent the positive and negative electrodes of the battery from contacting with each other, and it is improved continuously for requirements and expectations of the separator safety of the battery companies.

At present, lithium ion battery separators are mainly divided into two categories of polyolefin stretched film and non-woven fabric. Polyolefin stretched film (such as polyethylene (PE) or polypropylene (PP) film) has high technology maturity, and has advantages of excellent mechanical properties, chemical stability and relatively lower cost, which is thus currently the dominated separator in the market. However, polyolefin materials have limited temperature resistance, and the suitable working temperature is lower than 150° C. Although the thermal stability of the separator can be effectively improved by coating a high-temperature resistant ceramic on the polyolefin substrate. However, the test at 300° C. shows that the skeleton of the ceramic particles is still present, but the heat-resistant temperature of the coat binder is limited, resulting in that the strength of the separator is completely lost, and internal short circuits may easily occur. Therefore, the melting temperature of the substrate determines the heat-resistant temperature of the ceramic-coated separator. Non-woven fabric is a material with three-dimensional pore structure formed by non-directional accumulation of fibers. It has the characteristics of flexible selection of raw materials and flexible design of structure. As compared to the polyolefin separator, the non-woven fabric separator has advantages in terms of high temperature resistance, rapid charge and discharge performance and service life, but the non-woven fabric separator has low strength and large pores, which may cause a micro-short circuit of the battery.

There are many high-temperature resistant materials. However, it is very difficult to choose the materials and preparation methods thereof that simultaneously meet the requirements of the separator for thickness, strength, pores, liquid absorption, and subsequent coating. The patent application (Publication No. JP2005159283) in the name of Baoling Company in Japan proposes the use of high-temperature resistant aramid fiber or glass fiber, etc., combined with the wet papermaking process to prepare a non-woven separator, which however has the problems of low strength, large pore size, and easily causing internal short circuit. The patent application (Publication No. US20060024569) in the name of Degussa Company in German proposes to use polymer fibers to make a non-woven separator substrate, wherein the substrate is impregnated or coated with filler particles to prepare a composite separator. This separator has the problems of large pores and the filler particles being easy to fall off, and so on. When the separator is treated at 300° C. for 1 hour, the skeleton of the inorganic filler particles remains, but the strength of the separator is completely lost, and thus the isolation performance of the separator under high temperature conditions cannot be guaranteed. Japanese manufacturers are at the leading level in the research and development and industrialization technology of lithium battery separators. They mainly use open headbox to produce separator substrates. At lower speed, turbulence of pulp flow is caused by means of homogenizing rollers to achieve a good forming uniformity. However, as the speed increases, the pulp level of the open headbox increases with the square relationship of the speed, which often results in a poor flow state of the pulp flow in the box and a poor homogenization effect, thereby limiting the possibility of further increase of the headbox speed. The patent application (Publication No. CN104518188A) in the name of Mitsubishi Company in Japan proposes to mix 10-30% of solvent-spun fibers and synthetic fibers and use a process combined a round wire with a double-layer inclined wire to prepare a substrate of about 8.5 g/m$^2$ with a layer-to-layer basis weight ratio of 1:1 between layers. The substrate has the same two layers which are however respectively formed, so that the single layer has a low basis weight and is easy to form large pores. Even after double-layer compounding, large pores are inevitable. Under a requirement of lower thickness, too low single-layer basis weight is difficult to achieve the transfer of wet paper sheets, resulting in a very narrow adjustable range for double-layer fiber basis weight ratio. Especially, use of only nanofibers in a single-layer for making paper results in more difficult to achieve wet paper sheet transfer. Therefore, it is impossible to take full advantage of the double-layer structure and nanofibers to efficiently adjust the performance of the separator in terms of heat resistance, porosity and strength and so on. The patent application (Publication No. CN104157812A) in the name of the South China University of Technology proposes to use a multi-layer inclined wire former to prepare a three-layer lithium ion battery separator, the dense layer of which however uses some synthetic non-nanofibers, and thus the thermal stability of the separator can only achieve that heat shrinkage rate at 110° C. is less than 1.0%, which cannot meet the higher requirement of heat-resistant temperature; the support layer uses completely synthetic non-nanofibers which are relatively poor lyophilic and easy to introduce air bubbles, so that pin holes are formed in the support layer.

SUMMARY

The purpose of the disclosure is to overcome the shortcomings of the prior art and provide a lithium ion battery separator substrate having excellent high-temperature resistance. The substrate has a uniform and compact double-layer structure without pinholes, which has a tensile strength of up to 1054 N/m and a heat shrinkage rate at 110° C. of zero. The shrinkage thereof starts to occur only at about 300° C. The substrate still has good strength retention after being treated at 300° C. for 1 h and the heat shrinkage rate at 300° C. is less than 5%. In addition to meeting the requirements of porosity and strength, the substrate has a thinner thickness, especially with particularly good heat resistance and excellent comprehensive performance, and thus provides reliable technical and structural guarantee for the preparation of thinner high-temperature resistant lithium ion battery separators.

The purpose of the disclosure is achieved by the following technical solutions:

On the first aspect, the disclosure provides a lithium ion battery separator substrate, consisting of a support layer and a dense layer, wherein the support layer comprises or consists of superfine main fibers, thermoplastic bonded fibers and first nanofibers, and the dense layer comprises or consists of second nanofibers.

According to some examples of the present disclosure, the superfine main fibers are selected from one or more of the group consisting of stretched polyethylene terephthalate fibers (stretched PET), polyacrylonitrile fibers (PAN), polyamide fibers (PA) and polypropylene fibers (PP).

According to some examples of the present disclosure, the superfine main fibers are selected from one or more of the group consisting of stretched polyethylene terephthalate fibers (stretched PET), polyacrylonitrile fibers (PAN) and polyamide fibers (PA).

According to some examples of the present disclosure, the superfine main fibers are stretched polyethylene terephthalate fibers (stretched PET), polyacrylonitrile fibers (PAN) and/or polyamide fibers (PA).

According to some examples of the present disclosure, in weight percent, the ratio of the stretched polyethylene terephthalate fibers (stretched PET), the polyacrylonitrile fibers (PAN) and the polyamide fibers (PA) is (1-1.2):(1-1.2): 1, preferably 1:1:1.

According to some examples of the present disclosure, the thermoplastic bonded fibers are selected from one or more of the group consisting of polyethylene fibers (PE), polypropylene fibers (PP), unstretched polyethylene terephthalate fibers (unstretched PET), PP/PE bi-component fibers, PET/PE bi-component fibers, PET/PP bi-component fibers and PET/co-PET bi-component fibers.

According to some examples of the present disclosure, the thermoplastic bonded fibers are selected from one or more of the group consisting of unstretched polyethylene terephthalate fibers (unstretched PET), PET/co-PET bi-component fibers and PP/PE bi-component fibers.

According to some examples of the present disclosure, the thermoplastic bonded fibers are unstretched polyethylene terephthalate fibers (unstretched PET), PET/co-PET bi-component fibers or PP/PE bi-component fibers.

According to some examples of the present disclosure, the first nanofibers and the second nanofibers are independently selected from one or more of the group consisting of fibrillated poly-p-phenylene terephthalamide (PPTA) nanofibers, fibrillated lyocell nanofibers, fibrillated poly-p-phenylene benzodioxazole (PBO) nanofibers, fibrillated polyacrylonitrile (PAN) nanofibers, polyimide (PI) nanofibers and nanocellulose fibers.

According to some examples of the present disclosure, the first nanofibers and the second nanofibers are each independently fibrillated poly-p-phenylene terephthalamide (PPTA) nanofibers, fibrillated lyocell nanofibers, fibrillated poly-p-phenylene benzodioxazole (PB 0) nanofibers or fibrillated polyacrylonitrile (PAN) nanofibers.

According to some examples of the present disclosure, the second nanofibers are fibrillated poly-p-phenylene terephthalamide (PPTA) nanofibers and/or fibrillated lyocell nanofibers.

According to some examples of the present disclosure, in weight percent, the ratio of the fibrillated poly-p-phenylene terephthalamide (PPTA) nanofibers and fibrillated lyocell nanofibers is 1:(1-4), preferably 1:4.

According to some examples of the present disclosure, the superfine main fibers have a fiber diameter of 0.1-6 m, preferably 0.5-4 m, more preferably 0.5-3 m, and most preferably 1-3 μm; preferably, the superfine main fibers have a fiber length of 1-6 mm, preferably 2-4 mm, most preferably 3 mm.

According to some examples of the present disclosure, the thermoplastic bonded fibers have a fiber diameter of 0.1-8 m, preferably 0.5-6 m, more preferably 1-5 m, and most preferably 3-5 μm; preferably, the thermoplastic bonded fibers have a fiber length of 1-6 mm, preferably 2-4 mm, most preferably 3 mm.

According to some examples of the present disclosure, the first nanofibers and the second nanofibers have a beating degree of 60-95° SR, preferably 70-95° SR or 60-85° SR.

According to some examples of the present disclosure, the fibrillated poly-p-phenylene terephthalamide (PPTA) nanofibers have a beating degree of 60-85° SR, preferably 85° SR.

According to some examples of the present disclosure, the fibrillated lyocell nanofibers have a beating degree of 70-95° SR, preferably 95° SR.

According to some examples of the present disclosure, the fibrillated poly-p-phenylene benzoxadiazole (PBO) nanofibers and the fibrillated polyacrylonitrile (PAN) nanofibers have a beating degree of 85° SR.

According to some examples of the present disclosure, in weight percent, an amount of the support layer is in a range of 50-99 wt % based on the total basis weight of the separator substrate and an amount of the dense layer is in a range of 1-50 wt % based on the total basis weight of the separator substrate.

According to some examples of the present disclosure, in weight percent, an amount of the support layer is in a range of 50-95 wt % based on the total basis weight of the separator substrate and an amount of the dense layer is in a range of 5-50 wt % based on the total basis weight of the separator substrate.

According to some examples of the present disclosure, in weight percent, an amount of the support layer is in a range of 60-95 wt % based on the total basis weight of the separator substrate and an amount of the dense layer is in a range of 5-40 wt % based on the total basis weight of the separator substrate.

According to some examples of the present disclosure, in weight percent, an amount of the support layer is in a range of 60-80 wt % based on the total basis weight of the separator substrate and an amount of the dense layer is in a range of 20-40 wt % based on the total basis weight of the separator substrate.

According to some examples of the present disclosure, in weight percent, an amount of the support layer is in a range of 80-95 wt % based on the total basis weight of the separator substrate and an amount of the dense layer is in a range of 5-20 wt % based on the total basis weight of the separator substrate.

According to some examples of the present disclosure, in weight percent, an amount of the support layer is in a range of 80 wt % based on the total basis weight of the separator substrate and an amount of the dense layer is in a range of 20 wt % based on the total basis weight of the separator substrate.

According to some examples of the present disclosure, in weight percent, an amount of the support layer is in a range of 60 wt % based on the total basis weight of the separator substrate and an amount of the dense layer is in a range of 40 wt % based on the total basis weight of the separator substrate.

According to some examples of the present disclosure, in weight percent, an amount of the support layer is in a range of 95 wt % based on the total basis weight of the separator substrate and an amount of the dense layer is in a range of 5 wt % based on the total basis weight of the separator substrate.

According to some examples of the present disclosure, in weight percent, the support layer comprises or consists of 30-65 wt % of superfine main fibers, 30-65 wt % of thermoplastic bonded fibers and 5-30 wt % of the first nanofibers.

According to some examples of the present disclosure, in weight percent, the support layer comprises or consists of 30-45 wt % of superfine main fibers, 30-65 wt % of thermoplastic bonded fibers and 5-30 wt % of the first nanofibers.

According to some examples of the present disclosure, in weight percent, the support layer comprises or consists of 30-40 wt % of superfine main fibers, 30-65 wt % of thermoplastic bonded fibers, and 5-30 wt % of the first nanofibers.

According to some examples of the present disclosure, in weight percent, the support layer comprises or consists of 30-65 wt % of superfine main fibers, 30-40 wt % of thermoplastic bonded fibers, and 5-30 wt % of the first nanofibers.

According to some examples of the present disclosure, in weight percent, the support layer comprises or consists of 30-65 wt % of superfine main fibers, 40-65 wt % of thermoplastic bonded fibers, and 5-30 wt % of the first nanofibers.

According to some examples of the present disclosure, in weight percent, the support layer comprises or consists of 30-65 wt % of superfine main fibers, 30-65 wt % of thermoplastic bonded fibers and 5-15 wt % of the first nanofibers.

According to some examples of the present disclosure, in weight percent, the support layer comprises or consists of 30-65 wt % of superfine main fibers, 30-65 wt % of thermoplastic bonded fibers, and 15-30 wt % of the first nanofibers.

According to some examples of the present disclosure, in weight percent, the support layer consists of 30 wt % of superfine main fibers, 65 wt % of thermoplastic bonded fibers and 5 wt % of the first nanofibers.

According to some examples of the present disclosure, in weight percent, the support layer consists of 40 wt % of superfine main fibers, 30 wt % of thermoplastic bonded fibers and 30 wt % of the first nanofibers.

According to some examples of the present disclosure, in weight percent, the support layer consists of 45 wt % of superfine main fibers, 40 wt % of thermoplastic bonded fibers, and 15 wt % of first nanofibers.

According to some examples of the present disclosure, in weight percent, the support layer consists of 65 wt % of superfine main fibers, 30 wt % of thermoplastic bonded fibers, and 5 wt % of first nanofibers.

According to some examples of the present disclosure, the thickness of the substrate is 10-25 m, preferably 16-22 m, more preferably 17-21 µm; preferably, the basis weight of the substrate is 8-17 $g/m^2$, preferably 10-14 $g/m^2$, more preferably 11-13 $g/m^2$; preferably, the average pore size of the substrate is less than 3 µm; the maximum pore size of the substrate is less than 5 µm.

On the second aspect, the disclosure provides a method for preparing the lithium ion battery separator substrate as mentioned above. The method comprises the following steps in order:

Step a: Mixing the fiber materials of the support layer and the dense layer respectively with water, and then each independently defiberizing, beating and mixing to obtain a pulp, and then diluting the pulps with water by a flushing pump to an on-wire concentration;

Step b: Feeding the diluted pulps of the support layer and the dense layer into a HYDROFORMER™, a type of double-layer hydraulic inclined wire former, wherein the pulp of the dense layer enters the upper flow channel and the pulp of the support layer enters the flow channel close to a forming wire, laminating the pulp in each flow channel in the same area and making papers at the same time, and draining to obtain a wet paper sheet, forming a wet paper sheet for the substrate; preferably, further comprising rectification of the pulps to make the pulp appear a flow state of high-strength micro-turbulence before making papers;

Step c: Drying the wet paper sheet for the substrate obtained in step b to obtain a dry paper sheet for the substrate by a Yankee dryer; and Step d: Calendering the dry paper sheet for the substrate obtained in Step c by a metal roller and a soft roller to obtain the substrate.

According to some examples of the present disclosure, in step a, the solid weight percent concentrations of the pulps of the support layer and the dense layer are both 0.2 wt % before diluting with water.

According to some examples of the present disclosure, in step a, the concentration of the pulp of the support layer onto wire is 0.01-0.05 wt %, preferably 0.01-0.03 wt %, and most preferably 0.015-0.025 wt %; the concentration of the pulp of the dense layer onto wire is 0.002-0.05 wt %, preferably 0.005-0.04 wt %.

According to some examples of the present disclosure, in step b, the flow rate of flow channel of the pulp of the support layer is 160-3000 $m^3/h$, preferably 500-1000 $m^3/h$, more preferably 740 $m^3/h$; the flow rate of flow channel of the pulp of the dense layer is 40-750 $m^3/h$, preferably 100-480 $m^3/h$, more preferably 185 $m^3/h$.

According to some examples of the present disclosure, in step c, the drying temperature is 80-130° C.

According to some examples of the present disclosure, in step d, the calendering temperature is 110-220° C.

According to some examples of the present disclosure, when the thermoplastic bonded fibers in the support layer are unstretched PET fibers, the drying temperature is 80-130° C., preferably 120° C., and the calendering temperature is 170-220° C., preferably 190° C.

According to some examples of the present disclosure, when the thermoplastic bonded fibers in the support layer are PET/co-PET bi-component fibers or PP/PE bi-component fibers, the drying temperature is 80-130° C., preferably 90° C.; and the calendering temperature is 110-140° C., preferably 120° C.

In addition, the disclosure also provides a lithium ion battery separator prepared from the above lithium ion battery separator substrate, and a lithium ion battery comprising the battery separator.

Compared with the prior art, the disclosure has the following advantages:

The lithium ion battery separator substrate provided by the disclosure consists of a support layer and a dense layer with the specific basis weight and fiber type given by the disclosure, and the dense layer of the substrate is all made of nanofibers. Such composition and structure can maximize to achieve excellent high temperature resistance while maintaining good strength properties and pores, so that the heat shrinkage rate of the substrate at 110° C. is zero, and the substrate begins to shrink at about 300° C. The substrate still has good strength after treatment at 300° C. for 1 hour, and the heat shrinkage rate is less than 5.0%, preferably less than 3%, and also improves the stability and isolation of the structure at high temperatures. In addition, in the specific composition of the substrate of the disclosure, the use of the first nanofibers and the second nanofibers of the disclosure can also avoid pinholes in the support layer and improve the reliability and quality of product.

In addition, the disclosure uses one-shot forming method by a double-layer hydraulic inclined wire former (HYDROFORMER™) to make the pulps of the support layer and of the dense layer respectively, then laminate them in the same area with the specific on-wire concentration and the specific flow rate of the disclosure and make papers simultaneously, and dry and calender them by metal rollers and soft rollers at the specific temperature of the disclosure so as to obtain a stable, high temperature resistant lithium ion battery separator of the disclosure. More particularly, in the pulp distributor, the hydraulic pressure controlling cooperates with the specific high-speed pulp flow of the disclosure, so that the pulp with the specific composition and specific concentration of the disclosure generates high-strength micro-turbulence to eliminate the free surface through the change of the cross-section or geometric size of the fixed element, which is beneficial to the dispersion of fiber pulp and filler particles; then the two layers of raw materials are uniformly formed and closely combined in the hydraulic former, which improves the dimensional stability of the separator at high temperature. The layer materials of the two layers can be adjusted through the flow and concentration controlling, with the specific combination of the fiber materials and the separator structure of the disclosure, which can maximize the high temperature resistance and the tensile properties in the specific structure of the disclosure. The reinforcement of superfine main fibers and thermoplastic bonded fibers can also adjust the heat resistance, pore size and strength performance of the separator more efficiently and flexibly, thereby providing reliable technical and structural guarantee for the preparation of thinner high temperature resistant lithium ion battery separators.

BRIEF DESCRIPTION OF DRAWINGS

Embodiments of the disclosure are described in detail below with reference to the attached drawing figures, wherein.

DETAILED DESCRIPTION OF THE DISCLOSURE

The disclosure will be further described below in conjunction with specific embodiments. It should be understood that the embodiments of the disclosure are only used to illustrate the disclosure, and are not intended to limit the scope of the disclosure.

The experimental methods without specific conditions in the following examples are generally performed under conventional conditions or according to the conditions recommended by the manufacturer. Unless otherwise defined, all professional and scientific terms used in the text have the same meaning as familiar to those skilled in the art.

In addition, any methods and materials similar or equivalent to the described content can be applied to the method of the disclosure. The preferred implementation methods and materials described herein are for demonstration purposes only.

Figure 1:
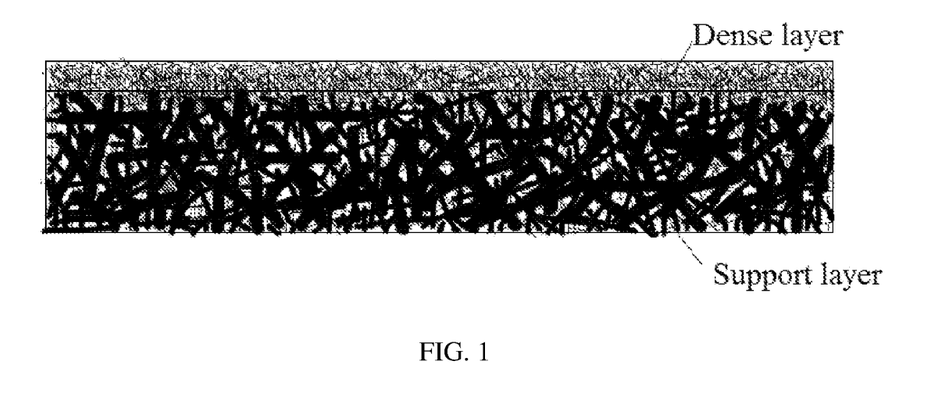
FIG. 1 is a schematic diagram of the apparent morphology of a lithium ion battery separator substrate prepared in Examples 1-63 of the disclosure.
Figure 2:
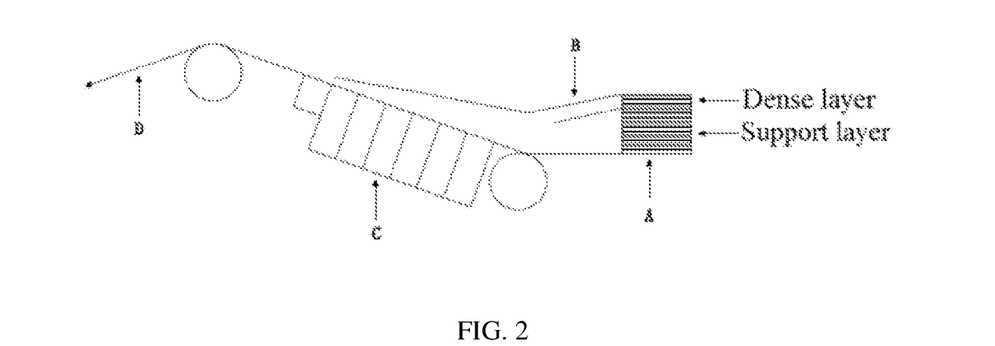
FIG. 2 is a schematic structural view of a HYDROFORMER™, a type of double-layer hydraulic inclined wire former, used in the disclosure, wherein A represents a pulp distributor, B represents a rectifying zone, C represents a substrate forming zone, and D represents a formed wet paper sheet of the substrate.

The following Examples 1-63 and Comparative Examples 1-11 only disclose examples of using some fiber materials to prepare substrates, and other fiber materials and combinations thereof given in the disclosure may also be used to prepare the substrate of the disclosure. The HYDROFORMER™, a type of double-layer hydraulic inclined wire former, used in Examples 1-63 of the disclosure is shown in FIG. 2, and the appearance of the prepared lithium ion battery separator substrate is shown in FIG. 1.

Example 1

A lithium ion battery separator substrate is consisting of a two-layer structure of a support layer and a dense layer, and is prepared by the following method:

Step a: Mixing the fiber materials of the support layer and the dense layer respectively with water in the defibizer according to the formulas shown in Table 1, defiberizing and beating to a solid weight percent concentration of 0.2 wt %, and then diluting by the flushing pump, wherein the fiber material of the support layer is diluted to a solid weight percent concentration of 0.02375 wt % to obtain Pulp 1; the fiber material of the dense layer is diluted to a solid weight percent concentration of 0.005 wt % to obtain Pulp 2.

Step b: Respectively feeding the pulp 1 and the pulp 2 obtained in step a into the HYDROFORMER™, a type of double-layer hydraulic inclined wire former, wherein the pulp 1 enters the lower flow channel at a flow rate of 740 m$^3$/h, the pulp 2 enters the upper flow channel at a flow rate of 185 m$^3$/h; after rectification, making papers of the two layers at the same time, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the lithium ion battery separator substrate of the disclosure.

Examples 2-4, 35-40, 47, 48

A lithium ion battery separator substrate is consisting of a two-layer structure of a support layer and a dense layer.

The formulas of the support layer and the dense layer are shown in Table 1. The preparation method is the same as that in Example 1.

Example 5

A lithium ion battery separator substrate is consisting of a two-layer structure of a support layer and a dense layer. The formulas of the support layer and the dense layer are shown in Table 1. The separator substrate is prepared by the following method:

Step a: Mixing the fiber materials of the support layer and the dense layer respectively with water in the defibizer according to the formulas shown in Table 1, defiberizing and beating to a solid weight percent concentration of 0.2 wt %, and then diluting by the flushing pump, wherein the fiber material of the support layer is diluted to a solid weight percent concentration of 0.02 wt % to obtain Pulp 1; the fiber material of the dense layer is diluted to a solid weight percent concentration of 0.02 wt % to obtain Pulp 2.

Step b: Respectively feeding the pulp 1 and the pulp 2 obtained in step a into the HYDROFORMER™, a type of double-layer hydraulic inclined wire former, wherein the pulp 1 enters the lower flow channel at a flow rate of 740 m$^3$/h, the pulp 2 enters the upper flow channel at a flow rate of 185 m$^3$/h; after rectification, making papers of the two layers at the same time, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the lithium ion battery separator substrate of the present disclosure.

Examples 6-8, 13-15, 22-28, 41-44, 61-63

A lithium ion battery separator substrate is consisting of a two-layer structure of a support layer and a dense layer. The formulas of the support layer and the dense layer are shown in Table 1. The preparation method is the same as that in Example 5.

Example 9

A lithium ion battery separator substrate is consisting of a two-layer structure of a support layer and a dense layer. The formulas of the support layer and the dense layer are shown in Table 1. The separator substrate is prepared by the following method:

Step a: Mixing the fiber materials of the support layer and the dense layer respectively with water in the defibizer according to the formulas shown in Table 1, defiberizing and beating to a solid weight percent concentration of 0.2 wt %, and then diluting by the flushing pump, wherein the fiber material of the support layer is diluted to a solid weight percent concentration of 0.015 wt % to obtain Pulp 1; the fiber material of the dense layer is diluted to a solid weight percent concentration of 0.04 wt % to obtain Pulp 2.

Step b: Respectively feeding the pulp 1 and the pulp 2 obtained in step a to the HYDROFORMER™, a type of double-layer hydraulic inclined wire former, wherein the pulp 1 enters the lower flow channel at a flow rate of 740 m$^3$/h, the pulp 2 enters the upper flow channel at a flow rate of 185 m$^3$/h; after rectification, making papers of the two layers at the same time, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the lithium ion battery separator substrate of the disclosure.

Examples 10-12, 29-34, 45-46

A lithium ion battery separator substrate is consisting of a two-layer structure of a support layer and a dense layer. The formulas of the support layer and the dense layer are shown in Table 1. The preparation method is the same as that in Example 9.

Examples 16, 19, 51-52, 55-56

A lithium ion battery separator substrate is consisting of a two-layer structure of a support layer and a dense layer. The formulas of the support layer and the dense layer are shown in Table 1. The separator substrate is prepared by the following method:

Step a and Step b are the same as in Example 5.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Examples 17-18, 20-21, 59-60

A lithium ion battery separator substrate is consisting of a two-layer structure of a support layer and a dense layer. The formulas of the support layer and the dense layer are shown in Table 1. The separator substrate is prepared by the following method:

Step a and Step b are the same as in Example 9.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Examples 49-50, 53-54, 57-58

A lithium ion battery separator substrate is consisting of a two-layer structure of a support layer and a dense layer. The formulas of the support layer and the dense layer are shown in Table 1. The separator substrate is prepared by the following method:

Step a and Step b are the same as in Example 1.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Comparative Example 1

A lithium ion battery separator substrate is consisting of a single layer structure. The formula of the single layer is shown in Table 2. The separator substrate is prepared by the following method:

Step a: Mixing the fiber material with water in the defibizer according to the formula shown in Table 2, defiberizing and beating to a solid weight percent concentration of 0.2 wt %, and then diluting the fiber material by the flushing pump to a solid weight percent concentration of 0.02 wt % to obtain a pulp.

Step b: Feeding the pulp obtained in step a to an inclined wire paper machine, wherein the flow rate of the pulp is 925 m³/h; after rectification, and draining to obtain a wet paper sheet for the substrate.

Step c: Drying the wet paper sheet for the substrate obtained in step b to obtain a dry paper sheet for the substrate at a temperature of 120° C. by a Yankee dryer.

Step d: Calendering the dry paper sheet for the substrate obtained in Step c at a temperature of 190° C. by a metal roller and a soft roller to obtain the single-layer lithium ion battery separator substrate.

Comparative Example 2

A lithium ion battery separator substrate is consisting of a single layer structure. The formula of the single layer is shown in Table 2. The preparation method is the same as that in Comparative Example 1.

Comparative Examples 3-5

A lithium ion battery separator substrate is consisting of a two-layer structure of a support layer and a dense layer. The formulas of the support layer and the dense layer are shown in Table 2. The preparation method is the same as that in Example 5.

Comparative Examples 6-7

A lithium ion battery separator substrate is consisting of a two-layer structure of a support layer and a dense layer. The formulas of the support layer and the dense layer are shown in Table 2. The preparation method is the same as that in Example 1.

Comparative Example 8

A lithium ion battery separator substrate is consisting of a two-layer structure of a support layer and a dense layer, and is prepared by the following method:

Step a: Mixing the fiber materials of the support layer and the dense layer respectively with water in the defibizer according to the formulas shown in Table 2, defiberizing and beating to a solid weight percent concentration of 0.2 wt %, and then diluting by the flushing pump, wherein the fiber material of the support layer is diluted to a solid weight percent concentration of 0.0125 wt % to obtain Pulp 1; the fiber material of the dense layer is diluted to a solid weight percent concentration of 0.05 wt % to obtain Pulp 2.

Step b, step c and step d are the same as in Example 1.

Comparative Examples 9-10

A lithium ion battery separator substrate is consisting of a two-layer structure of a support layer and a dense layer. The formulas of the support layer and the dense layer are shown in Table 2. The separator substrate is prepared by the following method:

Step a and step b are the same as in Example 5.

Step c: Drying the wet paper sheet for the substrate obtained in step b to obtain a dry paper sheet for the substrate at a temperature of 90° C. by a Yankee dryer.

Step d: Calendering the dry paper sheet for the substrate obtained in Step c at a temperature of 120° C. by a metal roller and a soft roller to obtain the lithium ion battery separator substrate of the disclosure.

Comparative Example 11

Chinese Patent CN201410496299.4 discloses a substrate for separators for lithium secondary batteries. The substrate for a separator is prepared by the following method: Using a disc mill, mix solvent-spun cellulose fibers 10% by mass, oriented crystalline polyethylene terephthalate (PET) short fibers 50% by mass and unstretched binder polyester fibers 40% by mass together, wherein the solvent-spun cellulose fibers have an average fiber diameter of 10 m, a fiber length of 4 mm, and a freeness of 97 ml; the oriented crystalline polyethylene terephthalate (PET) short fibers have an average fiber diameter of 2.4 m and fiber length of 3 mm; unstretched binder polyester fibers have an average fiber diameter of 4.4 m and fiber length of 3 mm; and then dissociate in the pulp machine water to obtain a uniform papermaking pulp (0.3 mass % concentration) on the basis of agitation using an agitator. The inclined short wire is used as the first layer and the rotary wire is used as the second layer, and the weight ratio of unit area of the inclined short wire to the rotary wire is set to 50:50 to laminate the papermaking pulp to obtain a wet sheet. After drying at a Yankee dryer temperature of 130° C., calender by a metal roller and an elastic roller with a surface temperature of 195° C. to obtain a weight per unit area of 8.2 g/m² and a thickness of 14.2 m of the substrate for separators for lithium secondary batteries.

TABLE 1

| | | Fiber formulation of Examples 1-63 (wt %) | | | |
|---|---|---|---|---|---|
| Examples | | Superfine main fibers | Thermoplastic bonded fibers | Nanofibers (the first nanofibers or the second nanofibers) | Proportion based on the total basis weight |
| Example 1 | Support layer | 45%[a] | 40%[d] | 15%[i] | 95% |
| | Dense layer | — | — | 100%[j] | 5% |
| Example 2 | Support layer | 30%[a] | 65%[d] | 5%[i] | 95% |
| | Dense layer | — | — | 100%[j] | 5% |

TABLE 1-continued

Fiber formulation of Examples 1-63 (wt %)

| Examples | | Superfine main fibers | Thermoplastic bonded fibers | Nanofibers (the first nanofibers or the second nanofibers) | Proportion based on the total basis weight |
|---|---|---|---|---|---|
| Example 3 | Support layer | 65% a) | 30% d) | 5% i) | 95% |
| | Dense layer | — | — | 100% j) | 5% |
| Example 4 | Support layer | 40% a) | 30% d) | 30% i) | 95% |
| | Dense layer | — | — | 100% j) | 5% |
| Example 5 | Support layer | 45% a) | 40% d) | 15% i) | 80% |
| | Dense layer | — | — | 100% j) | 20% |
| Example 6 | Support layer | 30% a) | 65% d) | 5% i) | 80% |
| | Dense layer | — | — | 100% j) | 20% |
| Example 7 | Support layer | 65% a) | 30% d) | 5% i) | 80% |
| | Dense layer | — | — | 100% j) | 20% |
| Example 8 | Support layer | 40% a) | 30% d) | 30% i) | 80% |
| | Dense layer | — | — | 100% j) | 20% |
| Example 9 | Support layer | 45% a) | 40% d) | 15% i) | 60% |
| | Dense layer | — | — | 100% j) | 40% |
| Example 10 | Support layer | 30% a) | 65% d) | 5% i) | 60% |
| | Dense layer | — | — | 100% j) | 40% |
| Example 11 | Support layer | 65% a) | 30% d) | 5% i) | 60% |
| | Dense layer | — | — | 100% j) | 40% |
| Example 12 | Support layer | 40% a) | 30% d) | 30% i) | 60% |
| | Dense layer | — | — | 100% j) | 40% |
| Example 13 | Support layer | 30% b) | 65% d) | 5% i) | 80% |
| | Dense layer | — | — | 100% j) | 20% |
| Example 14 | Support layer | 30% c) | 65% d) | 5% i) | 80% |
| | Dense layer | — | — | 100% j) | 20% |
| Example 15 | Support layer | 10% a) 10% b) 10% c) | 65% d) | 5% i) | 80% |
| | Dense layer | — | — | 100% j) | 20% |
| Example 16 | Support layer | 40% a) | 30% e) | 30% i) | 80% |
| | Dense layer | — | — | 100% j) | 20% |
| Example 17 | Support layer | 30% a) | 65% e) | 5% i) | 60% |
| | Dense layer | — | — | 100% j) | 40% |
| Example 18 | Support layer | 40% a) | 30% e) | 30% i) | 60% |
| | Dense layer | — | — | 100% j) | 40% |
| Example 19 | Support layer | 40% a) | 30% f) | 30% i) | 80% |
| | Dense layer | — | — | 100% j) | 20% |
| Example 20 | Support layer | 30% a) | 65% f) | 5% i) | 60% |
| | Dense layer | — | — | 100% j) | 40% |
| Example 21 | Support layer | 40% a) | 30% f) | 30% i) | 60% |
| | Dense layer | — | — | 100% j) | 40% |
| Example 22 | Support layer | 30% a) | 65% d) | 5% j) | 80% |
| | Dense layer | — | — | 100% i) | 20% |
| Example 23 | Support layer | 30% a) | 65% d) | 5% i) | 80% |
| | Dense layer | — | — | 100% i) | 20% |
| Example 24 | Support layer | 30% a) | 65% d) | 5% i) | 80% |
| | Dense layer | — | — | 50% i) 50% j) | 20% |
| Example 25 | Support layer | 30% a) | 65% d) | 5% g) | 80% |
| | Dense layer | — | — | 100% h) | 20% |
| Example 26 | Support layer | 45% b) | 40% d) | 15% i) | 80% |
| | Dense layer | — | — | 100% j) | 20% |
| Example 27 | Support layer | 45% c) | 40% d) | 15% i) | 80% |
| | Dense layer | — | — | 100% j) | 20% |
| Example 28 | Support layer | 12% a) 12% b) 11% c) | 40% d) | 15% i) | 80% |
| | Dense layer | — | — | 100% j) | 20% |
| Example 29 | Support layer | 30% b) | 65% d) | 5% i) | 60% |
| | Dense layer | — | — | 100% j) | 40% |
| Example 30 | Support layer | 30% c) | 65% d) | 5% i) | 60% |
| | Dense layer | — | — | 100% j) | 40% |
| Example 31 | Support layer | 10% a) 10% b) 10% c) | 65% d) | 5% i) | 60% |
| | Dense layer | — | — | 100% j) | 40% |
| Example 32 | Support layer | 45% b) | 40% d) | 15% i) | 60% |
| | Dense layer | — | — | 100% j) | 40% |
| Example 33 | Support layer | 45% c) | 40% d) | 15% i) | 60% |
| | Dense layer | — | — | 100% j) | 40% |
| Example 34 | Support layer | 12% a) 12% b) 11% c) | 40% d) | 15% i) | 60% |
| | Dense layer | — | — | 100% j) | 40% |

TABLE 1-continued

Fiber formulation of Examples 1-63 (wt %)

| Examples | | Superfine main fibers | Thermoplastic bonded fibers | Nanofibers (the first nanofibers or the second nanofibers) | Proportion based on the total basis weight |
|---|---|---|---|---|---|
| Example 35 | Support layer | 30% [b] | 65% [d] | 5% [i] | 95% |
| | Dense layer | — | — | 100% [j] | 5% |
| Example 36 | Support layer | 30% [c] | 65% [d] | 5% [i] | 95% |
| | Dense layer | — | — | 100% [j] | 5% |
| Example 37 | Support layer | 10% [a] 10% [b] 10% [c] | 65% [d] | 5% [i] | 95% |
| | Dense layer | — | — | 100% [j] | 5% |
| Example 38 | Support layer | 45% [b] | 40% [d] | 15% [i] | 95% |
| | Dense layer | — | — | 100% [j] | 5% |
| Example 39 | Support layer | 45% [c] | 40% [d] | 15% [i] | 95% |
| | Dense layer | — | — | 100% [j] | 5% |
| Example 40 | Support layer | 12% [a] 12% [b] 11% [c] | 40% [d] | 15% [i] | 95% |
| | Dense layer | — | — | 100% [j] | 5% |
| Example 41 | Support layer | 45% [a] | 40% [d] | 15% [j] | 80% |
| | Dense layer | — | — | 100% [i] | 20% |
| Example 42 | Support layer | 45% [a] | 40% [d] | 15% [g] | 80% |
| | Dense layer | — | — | 100% [h] | 20% |
| Example 43 | Support layer | 45% [a] | 40% [d] | 15% [i] | 80% |
| | Dense layer | — | — | 100% [i] | 20% |
| Example 44 | Support layer | 45% [a] | 40% [d] | 15% [i] | 80% |
| | Dense layer | — | — | 50% [i] 50% [j] | 20% |
| Example 45 | Support layer | 30% [a] | 65% [d] | 5% [i] | 60% |
| | Dense layer | — | — | 100% [i] | 40% |
| Example 46 | Support layer | 30% [a] | 65% [d] | 5% [i] | 60% |
| | Dense layer | — | — | 50% [i] 50% [j] | 40% |
| Example 47 | Support layer | 30% [a] | 65% [d] | 5% [i] | 95% |
| | Dense layer | — | — | 100% [i] | 5% |
| Example 48 | Support layer | 30% [a] | 65% [d] | 5% [i] | 95% |
| | Dense layer | — | — | 50% [i] 50% [j] | 5% |
| Example 49 | Support layer | 40% [a] | 30% [e] | 30% [i] | 95% |
| | Dense layer | — | — | 100% [j] | 5% |
| Example 50 | Support layer | 40% [a] | 30% [f] | 30% [i] | 95% |
| | Dense layer | — | — | 100% [j] | 5% |
| Example 51 | Support layer | 30% [a] | 65% [e] | 5% [i] | 80% |
| | Dense layer | — | — | 100% [j] | 20% |
| Example 52 | Support layer | 30% [a] | 65% [f] | 5% [i] | 80% |
| | Dense layer | — | — | 100% [j] | 20% |
| Example 53 | Support layer | 30% [a] | 65% [e] | 5% [i] | 95% |
| | Dense layer | — | — | 100% [j] | 5% |
| Example 54 | Support layer | 30% [a] | 65% [f] | 5% [i] | 95% |
| | Dense layer | — | — | 100% [j] | 5% |
| Example 55 | Support layer | 45% [a] | 40% [e] | 15% [i] | 80% |
| | Dense layer | — | — | 100% [j] | 20% |
| Example 56 | Support layer | 45% [a] | 40% [f] | 15% [i] | 80% |
| | Dense layer | — | — | 100% [j] | 20% |
| Example 57 | Support layer | 45% [a] | 40% [e] | 15% [i] | 95% |
| | Dense layer | — | — | 100% [j] | 5% |
| Example 58 | Support layer | 45% [a] | 40% [f] | 15% [i] | 95% |
| | Dense layer | — | — | 100% [j] | 5% |
| Example 59 | Support layer | 45% [a] | 40% [e] | 15% [i] | 60% |
| | Dense layer | — | — | 100% [j] | 40% |
| Example 60 | Support layer | 45% [a] | 40% [f] | 15% [i] | 60% |
| | Dense layer | — | — | 100% [j] | 40% |
| Example 61 | Support layer | 45% [a] | 40% [d] | 15% [i] | 80% |
| | Dense layer | — | — | 20% [i] 80% [j] | 20% |

TABLE 1-continued

Fiber formulation of Examples 1-63 (wt %)

| Examples | | Superfine main fibers | Thermoplastic bonded fibers | Nanofibers (the first nanofibers or the second nanofibers) | Proportion based on the total basis weight |
|---|---|---|---|---|---|
| Example 62 | Support layer | 45% $^{a)}$ | 40% $^{d)}$ | 15% $^{i)}$ | 80% |
| | Dense layer | — | — | 100% $^{k)}$ | 20% |
| Example 63 | Support layer | 45% $^{a)}$ | 40% $^{d)}$ | 15% $^{k)}$ | 80% |
| | Dense layer | — | — | 100% $^{l)}$ | 20% |

Note:
$^{a)}$ Stretched PET fiber with a fiber diameter of 2 μm and a fiber length of 3 mm;
$^{b)}$ PAN fiber with a fiber diameter of 2 μm and a fiber length of 3 mm;
$^{c)}$ PA fiber with a fiber diameter of 2 μm and a fiber length of 3 mm;
$^{d)}$ Unstretched PET fiber with a fiber diameter of 4 μm and a fiber length of 3 mm;
$^{e)}$ PET/co-PET bi-component fiber with a fiber diameter of 4 μm and a fiber length of 3 mm;
$^{f)}$ PP/PE bi-component fiber with a fiber diameter of 4 μm and a fiber length of 3 mm;
$^{g)}$ Fibrillated Tencel nanofiber with a beating degree of 70°SR, Lenzing, Austria;
$^{h)}$ Fibrillated PPTA nanofiber with a beating degree of 60°SR, DuPont Kevlar of the United States;
$^{i)}$ Fibrillated Tencel nanofiber with a beating degree of 95°SR, Lenzing, Austria;
$^{j)}$ Fibrillated PPTA nanofiber with a beating degree of 85°SR, DuPont Kevlar of the United States;
$^{k)}$ Fibrillated PBO nanofiber with a beating degree of 85°SR, Japan Toyobo Company;
$^{l)}$ Fibrillated PAN nanofiber with a beating degree of 85°SR.

TABLE 2

Fiber formulas (wt %) of Comparative Examples 1-10

| Examples | | Superfine main fibers | Thermoplastic bonded fibers | Nanofibers | Proportion based on the total basis weight |
|---|---|---|---|---|---|
| Comparative Example 1 | Single-layer | 50% $^{a)}$ | 50% $^{b)}$ | — | 100% |
| Comparative Example 2 | Single-layer | 45% $^{a)}$ | 40% $^{b)}$ | 15% $^{e)}$ | 100% |
| Comparative Example 3 | Support layer | 45% $^{a)}$ | 40% $^{b)}$ | 15% $^{e)}$ | 80% |
| | Dense layer | 20% $^{a)}$ | — | 80% $^{f)}$ | 20% |
| Comparative Example 4 | Support layer | 50% $^{a)}$ | 50% $^{b)}$ | — | 80% |
| | Dense layer | — | — | 100% $^{f)}$ | 20% |
| Comparative Example 5 | Support layer | 75% $^{a)}$ | 20% $^{b)}$ | 5% $^{e)}$ | 80% |
| | Dense layer | — | — | 100% $^{f)}$ | 20% |
| Comparative Example 6 | Support layer | 30% $^{a)}$ | 30% $^{b)}$ | 40% $^{e)}$ | 95% |
| | Dense layer | — | — | 100% $^{f)}$ | 5% |
| Comparative Example 7 | Support layer | 30% $^{a)}$ | 30% $^{b)}$ | 40% $^{f)}$ | 95% |
| | Dense layer | — | — | 100% $^{f)}$ | 5% |
| Comparative Example 8 | Support layer | 45% $^{a)}$ | 40% $^{b)}$ | 15% $^{e)}$ | 50% |
| | Dense layer | — | — | 100% $^{f)}$ | 50% |
| Comparative Example 9 | Support layer | 75% $^{a)}$ | 20% $^{c)}$ | 5% $^{e)}$ | 80% |
| | Dense layer | — | — | 100% $^{f)}$ | 20% |
| Comparative Example 10 | Support layer | 75% $^{a)}$ | 20% $^{d)}$ | 5% $^{e)}$ | 80% |
| | Dense layer | — | — | 100% $^{f)}$ | 20% |

Note:
$^{a)}$ Stretched PET fiber with a fiber diameter of 2 μm and a fiber length of 3 mm;
$^{b)}$ Unstretched PET fiber with a fiber diameter of 4 μm and a fiber length of 3 mm;
$^{c)}$ PET/co-PET bi-component fiber with a fiber diameter of 4 μm and a fiber length of 3 mm;
$^{d)}$ PP/PE bi-component fiber with a fiber diameter of 4 μm and a fiber length of 3 mm;
$^{e)}$ Fibrillated Tencel nanofiber with a beating degree of 95°SR, Lenzing, Austria;
$^{f)}$ Fibrillated PPTA nanofiber with a beating degree of 85°SR, DuPont Kevlar of the United States.

Performance Test of the Lithium Ion Battery Separator Substrate

The lithium ion battery separator substrates prepared in Examples 1-63 and Comparative Examples 1-11 were tested for performance. The test items and methods are as follows:
1. Basis weight, thickness and tensile strength: measured by TAPPI standard.
2. Average pore size and maximum pore size: measured using a PMI pore size analyzer.
3. Heat shrinkage rate The dimensional stability of the substrate at a certain temperature can be characterized by the thermal stability of the substrate, usually expressed in heat shrinkage rate. Test of the heat shrinkage rate of the substrate as follows:

Cutting the substrate into squares with side length $L_b$, and then respectively placing the substrate in an environment of 110° C. and 300° C. for 1 hour, testing the side length $L_a$ of the substrate, and calculating the shrinkage rate according to the following formula:

$$\text{Shrinkage rate}(\%) = (L_b - L_a)/L_b \times 100$$

4. Substrate strength retention

The substrate was placed in a 300° C. environment for 1 hour and taken out. The strength retention of the substrate was evaluated according to the following criteria:

○: Fold the substrate 10 times without breaking;

Δ: Fold the substrate 2-10 times and break;

x: Fold the substrate once and break.

TABLE 3

Performance test parameter of the lithium ion battery separator substrate of the disclosure

| Examples | Basis weight g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| 1 | 11.8 | 19.3 | 832 | 1.93 | 3.35 | 4.7 | Δ |
| 2 | 12.3 | 19.8 | 1025 | 2.63 | 4.85 | 4.8 | Δ |
| 3 | 11.9 | 19.8 | 608 | 2.58 | 4.73 | 4.8 | Δ |
| 4 | 12.2 | 18.4 | 583 | 1.42 | 2.43 | 4.5 | Δ |
| 5 | 12.0 | 18.6 | 723 | 1.52 | 2.58 | 2.8 | ○ |
| 6 | 12.2 | 19.1 | 925 | 1.81 | 3.12 | 3.0 | ○ |
| 7 | 11.9 | 19.1 | 545 | 1.76 | 2.87 | 3.0 | ○ |
| 8 | 11.7 | 17.9 | 519 | 1.02 | 1.96 | 2.6 | ○ |
| 9 | 12.2 | 17.8 | 489 | 0.89 | 1.65 | 2.0 | ○ |
| 10 | 11.8 | 18.2 | 673 | 1.05 | 1.95 | 2.2 | ○ |
| 11 | 12.2 | 18.2 | 453 | 1.01 | 1.91 | 2.2 | ○ |
| 12 | 12.1 | 17.3 | 432 | 0.52 | 1.34 | 1.8 | ○ |
| 13 | 12.2 | 19.8 | 854 | 1.96 | 3.53 | 3.2 | ○ |
| 14 | 12.1 | 20.2 | 847 | 2.04 | 3.61 | 3.2 | ○ |
| 15 | 12.0 | 19.7 | 876 | 1.92 | 3.43 | 3.2 | ○ |
| 16 | 11.8 | 18.9 | 474 | 1.23 | 2.18 | 2.8 | ○ |
| 17 | 11.8 | 19.2 | 596 | 1.21 | 2.15 | 2.2 | ○ |
| 18 | 12.1 | 18.3 | 403 | 0.64 | 1.52 | 1.8 | ○ |
| 19 | 11.7 | 18.9 | 476 | 1.25 | 2.23 | 2.6 | ○ |
| 20 | 11.9 | 20.2 | 623 | 1.35 | 2.34 | 2.2 | ○ |
| 21 | 12.1 | 19.3 | 408 | 0.62 | 1.50 | 1.8 | Δ |
| 22 | 12.1 | 19.2 | 915 | 1.93 | 3.37 | 3.2 | Δ |
| 23 | 11.9 | 19.1 | 953 | 1.79 | 3.09 | 3.4 | Δ |
| 24 | 11.8 | 19.3 | 934 | 1.81 | 3.11 | 3.1 | ○ |
| 25 | 11.9 | 19.4 | 912 | 1.96 | 3.43 | 3.2 | ○ |
| 26 | 12.2 | 19.5 | 652 | 1.58 | 2.67 | 2.8 | ○ |
| 27 | 12.1 | 19.4 | 642 | 1.59 | 2.70 | 2.8 | ○ |
| 28 | 12.0 | 19.0 | 681 | 1.55 | 2.62 | 2.8 | ○ |
| 29 | 12.2 | 18.8 | 625 | 1.17 | 2.11 | 2.2 | ○ |
| 30 | 11.9 | 18.9 | 620 | 1.15 | 2.07 | 2.2 | ○ |
| 31 | 12.0 | 18.4 | 643 | 1.12 | 2.04 | 2.2 | ○ |
| 32 | 11.6 | 17.8 | 443 | 0.93 | 1.75 | 2.0 | ○ |
| 33 | 11.9 | 17.8 | 434 | 0.92 | 1.73 | 2.0 | ○ |
| 34 | 11.9 | 17.8 | 458 | 0.91 | 1.70 | 2.0 | ○ |
| 35 | 12.2 | 19.8 | 925 | 2.72 | 4.98 | 4.8 | ○ |
| 36 | 12.0 | 19.8 | 914 | 2.71 | 4.96 | 4.8 | ○ |
| 37 | 11.7 | 19.8 | 978 | 2.68 | 4.91 | 4.8 | ○ |
| 38 | 12.2 | 20.3 | 758 | 1.99 | 3.48 | 4.7 | ○ |
| 39 | 12.0 | 20.4 | 749 | 1.98 | 3.46 | 4.7 | ○ |
| 40 | 12.2 | 19.7 | 783 | 1.95 | 3.38 | 4.7 | ○ |
| 41 | 12.2 | 18.6 | 701 | 1.59 | 2.78 | 2.9 | Δ |
| 42 | 11.9 | 18.6 | 708 | 1.61 | 2.84 | 3.0 | ○ |
| 43 | 11.9 | 18.6 | 746 | 1.50 | 2.51 | 3.2 | Δ |
| 44 | 11.8 | 18.6 | 734 | 1.51 | 2.53 | 2.9 | Δ |
| 45 | 11.8 | 18.2 | 698 | 1.02 | 1.92 | 2.2 | Δ |
| 46 | 11.9 | 18.2 | 686 | 1.03 | 1.93 | 2.2 | Δ |
| 47 | 11.8 | 19.8 | 1054 | 2.58 | 4.73 | 4.9 | Δ |
| 48 | 11.9 | 19.8 | 1035 | 2.60 | 4.82 | 4.8 | Δ |
| 49 | 12.1 | 19.4 | 529 | 1.52 | 2.42 | 4.5 | ○ |
| 50 | 12.0 | 19.4 | 526 | 1.53 | 2.47 | 4.5 | ○ |
| 51 | 11.9 | 20.3 | 839 | 1.95 | 3.50 | 3.2 | ○ |
| 52 | 11.8 | 20.5 | 821 | 1.97 | 3.55 | 3.2 | ○ |
| 53 | 12.1 | 20.8 | 954 | 2.69 | 4.92 | 2.8 | ○ |
| 54 | 12.1 | 20.8 | 945 | 2.71 | 4.97 | 2.8 | ○ |
| 55 | 12.1 | 19.6 | 634 | 1.62 | 2.73 | 2.8 | ○ |
| 56 | 11.9 | 19.6 | 623 | 1.64 | 2.78 | 2.8 | ○ |
| 57 | 11.9 | 20.3 | 753 | 1.99 | 3.50 | 4.7 | ○ |
| 58 | 12.0 | 20.3 | 743 | 2.01 | 3.52 | 4.7 | ○ |
| 59 | 12.1 | 18.8 | 434 | 0.93 | 1.78 | 2.2 | ○ |
| 60 | 11.9 | 18.8 | 428 | 0.97 | 1.83 | 2.2 | ○ |
| 61 | 11.8 | 18.6 | 682 | 1.49 | 2.56 | 2.9 | ○ |
| 62 | 12.1 | 18.6 | 673 | 1.58 | 2.67 | 2.8 | ○ |
| 63 | 12.0 | 18.6 | 668 | 1.62 | 2.73 | 2.8 | ○ |

Note:
The lithium ion battery separator substrate of the disclosure has a heat shrinkage rate of zero at 110° C., and shrinkage only begins when it is close to 300° C.

TABLE 4

Performance test parameter of the lithium ion battery separator substrate

| Parameter | Basis weight g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| Comparative Example 1 | 11.8 | 20.3 | 1069 | 5.30 | 100.4 | Melting | x |
| Comparative Example 2 | 12.3 | 19.5 | 903 | 3.53 | 15.5 | 15.0 | Δ |
| Comparative Example 3 | 12.2 | 18.8 | 854 | 2.68 | 7.49 | 7.8 | ○ |
| Comparative Example 4 | 12.0 | 19.3 | 789 | 2.53 | 6.55 | 3.2 | ○ |
| Comparative Example 5 | 11.9 | 19.1 | 314 | 1.82 | 2.96 | 3.0 | ○ |
| Comparative Example 6 | 11.7 | 17.9 | 365 | 1.55 | 2.59 | 4.5 | Δ |
| Comparative Example 7 | 12.2 | 17.9 | 345 | 1.65 | 2.77 | 4.5 | Δ |
| Comparative Example 8 | 11.8 | 17.4 | 332 | 0.73 | 1.58 | 1.8 | ○ |
| Comparative Example 9 | 11.8 | 19.1 | 283 | 1.79 | 2.94 | 3.0 | ○ |
| Comparative Example 10 | 11.9 | 19.1 | 276 | 1.81 | 2.95 | 3.0 | ○ |
| Comparative Example 11 | 8.2 | 14.2 | 636 | 5.58 | 8.02 | 25.0 | Δ |

It can be seen from Table 3 that the lithium ion battery separator substrates obtained in Examples 1-63 of the disclosure have a basis weight of about 11 to 13 g/m² and a thickness of 17 to 21 μm. The separator substrates comprise a support layer and a dense layer. In weight percent, the proportion of the support layer is in a range of 60-95% based on the total basis weight of the separator substrate and an proportion of the dense layer is in a range of 5-40% based on the total basis weight of the separator substrate. In the support layer, the amount of stretched PET fibers is 30-65%, the amount of unstretched PET fibers is 30-65% and the amount of nanofibers is 5-30%. The dense layer is made of 100% nanofibers. According to the above requirements, the lithium ion battery separator substrates are made of HYDROFORMER™, a type of double-layer hydraulic inclined wire former. The maximum pore size of the lithium ion battery separator substrates is less than 5 μm, the strength is greater than 400 N/m, and the maximum can reach 1054 N/m. The heat shrinkage rate at 110° C. is zero, and the separator substrate still has a certain strength at 300° C. for 1 hour and the heat shrinkage rate is less than 5.0%, preferably less than 2%, which is enough to ensure that the separator prepared directly from the substrate or the separator coated with other materials such as ceramic particles have excellent thermal stability and the thickness of the separator is thinner.

It can be seen from Table 4 that in Comparative Example 1, the single-layer substrate is only made of PET fibers with pinholes, wherein the pore size is too large, and melting occurs at 300° C.; in Comparative Example 2, the single-layer substrate is made of PET fibers and fibrillated lyocell nanofibers, wherein the pore size is too large, the heat shrinkage rate of the substrate is 15.0% after treatment at 300° C. for 1 h, and the substrate is damaged after folding; in Comparative Example 3, the two layers substrate is made by a HYDROFORMER™, a type of double-layer hydraulic inclined wire former, and the dense layer of the substrate is added with 20% stretched PET fiber and 80% fibrillated PPTA fiber, so that the substrate has a heat shrinkage rate of 7.8% after treatment at 300° C. for 1 hour; in Comparative Example 4, the support layer does not use nanofibers, which causes the maximum pore diameter of the substrate to be too large; in Comparative Examples 5-10, the substrate strength cannot meet the requirements; in Comparative Example 11, the maximum pore diameter of the separator described is too large, and there is no double-layer structure, the heat shrinkage rate is 25.0% after treatment at 300° C. for 1 hour.

It should be understood that the disclosure described herein is not limited to specific methodologies, experimental protocols, or reagents, as these may vary. The discussion and examples provided herein are presented to describe specific embodiments and are not intended to limit the scope of the disclosure, which is limited only by the claims.

What is claimed is:
1. A method of preparing a lithium ion battery separator substrate, comprising:
mixing fiber materials of a support layer and a nano layer respectively with water, and then each independently defiberizing, beating and mixing to obtain pulps, and then diluting the pulps with water by a flushing pump to add water to an on-wire concentration;
feeding the diluted pulps of the support layer and the nano layer to a double-layer hydraulic inclined wire former, wherein the pulp of the nano layer enters an upper flow channel and the pulp of the support layer enters a lower flow channel, laminating the pulp of each flow channel in the same area and then making papers at the same time, and draining to obtain a wet paper sheet, forming the wet paper sheet for the substrate;
drying the wet paper sheet for the substrate obtained to obtain a dry paper sheet for the substrate by a Yankee dryer; and
calendering the dry paper sheet for the substrate obtained by a metal roller and a soft roller to obtain the substrate;
wherein, in weight percent, the support layer consists of 30-65 wt % of superfine main fibers, 30-65 wt % of thermoplastic bonded fibers and 5-30 wt % of first nanofibers; the nano layer consists of second nanofibers;

wherein, the superfine main fibers are the superfine main fibers are stretched polyethylene terephthalate fibers (stretched PET), polyacrylonitrile fibers (PAN) and/or polyamide fibers (PA); the thermoplastic bonded fibers are unstretched polyethylene terephthalate fibers (unstretched PET), PP/PE bi-component fibers or PET/co-PET bi-component fibers; the first nanofibers and the second nanofibers are independently fibrillated poly-p-phenylene terephthalamide (PPTA) nanofibers, fibrillated lyocell nanofibers, fibrillated poly-p-phenylene benzodioxazole (PBO) nanofibers or fibrillated polyacrylonitrile (PAN) nanofibers;

wherein; the superfine main fibers have a fiber diameter of 1-3 μm; the superfine main fibers have a fiber length of 2-4 mm; the thermoplastic bonded fibers have a fiber diameter of 3-5 μm; the thermoplastic bonded fibers have a fiber length of 2-4 mm; the first nanofibers and the second nanofibers have a beating degree of 60-95° SR;

wherein, in weight percent, an amount of the support layer is in a range of 60-95 wt % based on the total basis weight of the separator substrate and an amount of the nano layer is in a range of 5-40 wt % based on the total basis weight of the separator substrate.

2. The method according to claim 1, wherein, when the thermoplastic bonded fibers in the support layer are the unstretched PET fibers, a drying temperature is 120° C., and a calendering temperature is 170-220° C.

3. The method according to claim 1, wherein, a thickness of the substrate is 10-25 μm; a basis weight of the substrate is 8-17 g/m²; an average pore size of the substrate is less than 3 μm; and a maximum pore size of the substrate is less than 5 μm.

4. The method according to claim 1, wherein, when the thermoplastic bonded fibers in the support layer are the PET/co-PET bi-component fibers or the PP/PE bi-component fibers, a drying temperature is 90° C.; and a calendering temperature is 110-140° C.

5. The method according to claim 1, wherein, the fibrillated poly-p-phenylene terephthalamide (PPTA) nanofibers have a beating degree of 60-85° SR;

the fibrillated lyocell nanofibers have a beating degree of 70-95° SR; and the fibrillated poly-p-phenylene benzoxadiazole (PBO) nanofibers and the fibrillated polyacrylonitrile (PAN) nanofibers have a beating degree of 85° SR.

6. The method according to claim 1, wherein, the solid weight percent concentrations of the pulps of the support layer and the nano layer are both 0.2 wt % before diluting with water; the on-wire concentration of the pulp of the support layer is 0.01-0.05 wt %; the on-wire concentration of the pulp of the nano layer is 0.002-0.05 wt %;

the flow rate of the pulp of the support layer is 160-3000 m³/h; the flow rate of the pulp of the nano layer is 40-750 m³/h;

a drying temperature is 80-130° C.; and a calendering temperature is 110-220° C.

* * * * *